United States Patent
Henry

(10) Patent No.: US 12,514,517 B2
(45) Date of Patent: Jan. 6, 2026

(54) IMAGE TRANSFORMATION METHOD AND APPARATUS

(71) Applicant: CANON MEDICAL SYSTEMS CORPORATION, Otawara (JP)

(72) Inventor: Joseph Henry, Edinburgh (GB)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 322 days.

(21) Appl. No.: 18/327,372

(22) Filed: Jun. 1, 2023

(65) Prior Publication Data

US 2024/0398360 A1    Dec. 5, 2024

(51) Int. Cl.
| | |
|---|---|
| A61B 6/03 | (2006.01) |
| G06T 3/40 | (2006.01) |
| G06T 5/50 | (2006.01) |
| G06T 7/00 | (2017.01) |
| G06V 10/75 | (2022.01) |

(52) U.S. Cl.
CPC ............ *A61B 6/032* (2013.01); *G06T 3/40* (2013.01); *G06T 5/50* (2013.01); *G06T 7/0014* (2013.01); *G06V 10/758* (2022.01); *G06T 2207/10081* (2013.01); *G06T 2207/20132* (2013.01); *G06T 2207/20224* (2013.01)

(58) Field of Classification Search
CPC ............ A61B 6/032; G06T 11/005; G06T 2207/10081; G06T 2207/20132; G06T 2207/20224; G06T 2211/404; G06T 2211/441; G06T 2211/444; G06T 3/40; G06T 5/50; G06T 7/0014; G06V 10/758

See application file for complete search history.

(56) References Cited

U.S. PATENT DOCUMENTS

| | | | |
|---|---|---|---|
| 2007/0140541 A1 | 6/2007 | Bae et al. | |
| 2015/0339809 A1 | 11/2015 | Ohishi | |
| 2019/0046145 A1* | 2/2019 | Leghissa | G06T 7/30 |
| 2019/0362522 A1 | 11/2019 | Han | |
| 2020/0202502 A1 | 6/2020 | Tsymbalenko | |

(Continued)

FOREIGN PATENT DOCUMENTS

| | | |
|---|---|---|
| CN | 109166087 A | 1/2019 |
| CN | 110503715 A | 11/2019 |

(Continued)

OTHER PUBLICATIONS

Avi-Aharon et al., "DeepHist: Differentiable Joint and Color Histogram Layers for Image-to-Image Translation", arXiv Preprint arXiv;2005.03995, May 6, 2020, pp. 1-22.

(Continued)

*Primary Examiner* — Manuchehr Rahmjoo
(74) *Attorney, Agent, or Firm* — Oblon, McClelland, Maier & Neustadt, L.L.P.

(57) ABSTRACT

A medical image processing apparatus comprises processing apparatus configured to: receive CT (computed tomography) image data acquired using a first scan setting; input the CT image data to an adapter to obtain corrected CT image data, wherein the adapter is configured to transform a first image style of the CT image data acquired using the first scan setting to a second, different image style that is characteristic of CT image data acquired using a second scan setting that is different from the first scan setting; and output the corrected CT image data.

18 Claims, 8 Drawing Sheets

(56) References Cited

U.S. PATENT DOCUMENTS

2020/0311878 A1   10/2020   Matsuura et al.
2021/0233239 A1    7/2021   Li et al.

FOREIGN PATENT DOCUMENTS

WO    WO 2021/236306 A1   11/2021
WO    WO 2022/089257 A1    5/2022

OTHER PUBLICATIONS

Guo, "Multi-Modal Image Registration with Unsupervised Deep Learning", Massachusetts Institute of Technology, 2019, pp. 1-40.

Wang et al., "Image Quality Assessment: From Error Visibility to Structural Similarity", IEEE Transaction on Image Processing, vol. 13, No. 4, Apr. 2004, pp. 1-14.

Koike et al., "Deep learning-based virtual noncontrast CT for volumetric modulated arc therapy planning: Comparison with a dual-energy CT-based approach", Med. Phys. vol. 47, 2020, pp. 371-379.

Gu et al., "Contrast-enhanced to noncontrast CT transformation via an adjacency content-transfer-based deep subtraction residual neural network", Phys. Med. Biol., vol. 66, 2021, pp. 1-19 (total 20 pages).

Liugang et al., "Generation of Virtual Non-Contrast CT from Intravenous Enhanced CT in Radiotherapy Using Convolutional Neural Networks", Frontiers in Oncology, vol. 10, Sep. 8, 2020, pp. 1-9.

Song et al., "Non-contrast CT Liver Segmentation Using CycleGAN Data Augmentation From Contrast Enhanced CT", Springer Nature Switzerland, 2020, pp. 122-129.

Du et al., "Deep learning-based harmonization of CT reconstruction kernels towards improved clinical task performance", European Radiology, vol. 33, 2022, pp. 2426-2438.

Dabbah et al., "Detection and location of 127 anatomical landmarks in diverse CT datasets", Proceedings of SPIE—The International Society for Optical Engineering, Apr. 2014, pp. 1-12.

Extended European Search Report issued Nov. 11, 2024 in European Patent Application No. 24179136.7, 9 pages.

Yufeng Gao, et al., "Deep learning-based digital subtraction angiography image generation", International Journal of Computer Assisted Radiology and Surgery, vol. 14, No. 10, Jul. 2019, XP036908866, pp. 1775-1784.

Mathias Unberath, et al., "Virtual Single-frame Subtraction Imaging", URL:https://www5.informatik.uni-erlangen.de/Forschung/Publikationen/2016/Unberath16-VSS.pdf, Jul. 2016, XP055453491, 4 pages.

* cited by examiner

IMAGE TRANSFORMATION METHOD AND APPARATUS

FIELD

Embodiments described herein relate generally to an image processing method and apparatus, for example a method and apparatus for transforming image data from a first image style to a second image style.

BACKGROUND

Medical imaging techniques that can produce medical imaging data using any of a variety of imaging modalities are widely used for imaging or diagnostic purposes. For example, computed tomography (CT) imaging may be used.

When performing a CT scan of a region of a patient's body, it is common to first obtain a scanogram, which may be used for positioning of the patient. The scanogram may be two-dimensional. The scanogram may be a low-dose scan. The scanogram may be a low-resolution scan. The scanogram may have a larger field of view than the scan of the region that is to be performed. For example, if the region that is to be scanned is the lungs, the scanogram may include the whole of the patient's torso or a large part of the patient's torso. If the region that is to be scanned is the brain, the scanogram may include all of the patient's head and neck.

The scanogram may be performed before obtaining CT scans of a target region. The CT scans may include pre-contrast and post-contrast scans.

It is known to introduce a contrast agent into blood vessels of a patient, where the contrast agent increases the intensity of the vessel lumen in imaging. An imaging data set that is obtained using a contrast agent may be referred to as a contrast volume, contrast-enhanced volume or CT angiography volume. An imaging data set that is obtained without the contrast agent present may be referred to as a pre-contrast volume or mask volume. Vessels are generally less visible in the mask volume than in the contrast volume due to the absence of contrast agent.

A subtraction volume may be obtained by subtracting a mask volume and a contrast volume that are representative of the same anatomy. For example, the subtracting may comprise subtracting intensities of the mask volume from intensities of the contrast volume at each corresponding location in the mask volume and contrast volume. The subtraction process may remove features that are common to the contrast volume and the mask volume (for example, bone and soft tissue) and leave only the parts of the contrast volume that have been enhanced by the contrast agent.

FIG. 1 is a flow chart illustrating in overview a subtraction process. At stage 10, a pre-contrast volume, which may also be called a mask volume, is obtained by CT imaging of a region without contrast. At stage 12, a post-contrast volume is obtained by CT imaging of the same region with contrast. At stage 14, a registration is performed to align the pre-contrast volume and post-contrast volume. At stage 16, the registered pre-contrast volume and post-contrast volume are subtracted to obtain a subtraction volume 18.

The subtraction procedure may provide an enhanced view of contrasted anatomy, for example an image of the vasculature, or a heat map of the lungs showing where perfusion is lacking. However, the subtraction procedure requires an additional radiation dose to obtain the pre-contrast mask volume in addition to the contrast volume.

BRIEF DESCRIPTION OF THE DRAWINGS

Embodiments are now described, by way of non-limiting example, and are illustrated in the following figures, in which.

DETAILED DESCRIPTION

Certain embodiments provide a medical image processing apparatus comprising processing apparatus configured to: receive CT (computed tomography) image data acquired using a first scan setting; input the CT image data to an adapter to obtain corrected CT image data, wherein the adapter is configured to transform a first image style of the CT image data acquired using the first scan setting to a second, different image style that is characteristic of CT image data acquired using a second scan setting that is different from the first scan setting; and output the corrected CT image data.

Certain embodiments provide a method comprising: receiving CT (computed tomography) image data acquired using a first scan setting; inputting the CT image data to an adapter to obtain corrected CT image data, wherein the adapter is configured to transform a first image style of the CT image data acquired using the first scan setting to a second, different image style that is characteristic of data acquired using a second scan setting that is different from the first scan setting; and outputting the corrected CT image data.

Certain embodiments provide a medical image processing apparatus comprising processing apparatus configured to: receive training data representative of a plurality of subjects, wherein the training data comprises, for each subject, CT image data acquired using a first scan setting and corresponding CT image data acquired using a second, different scan setting; and train an adapter to transform a first image style of the CT image data acquired using the first scan setting to a second, different image style that is characteristic of CT image data acquired using the second scan setting, wherein the training of the adapter comprises using a first loss based on anatomical structure and a second loss based on image intensity.

Certain embodiments provide a method comprising: receiving training data representative of a plurality of subjects, wherein the training data comprises, for each subject, CT image data acquired using a first scan setting and corresponding CT image data acquired using a second, different scan setting; and training an adapter to transform a first image style of the CT image data acquired using the first scan setting to a second, different image style that is characteristic of CT image data acquired using the second scan setting, wherein the training of the adapter comprises using a first loss based on anatomical structure and a second loss based on image intensity.

Figure 1:
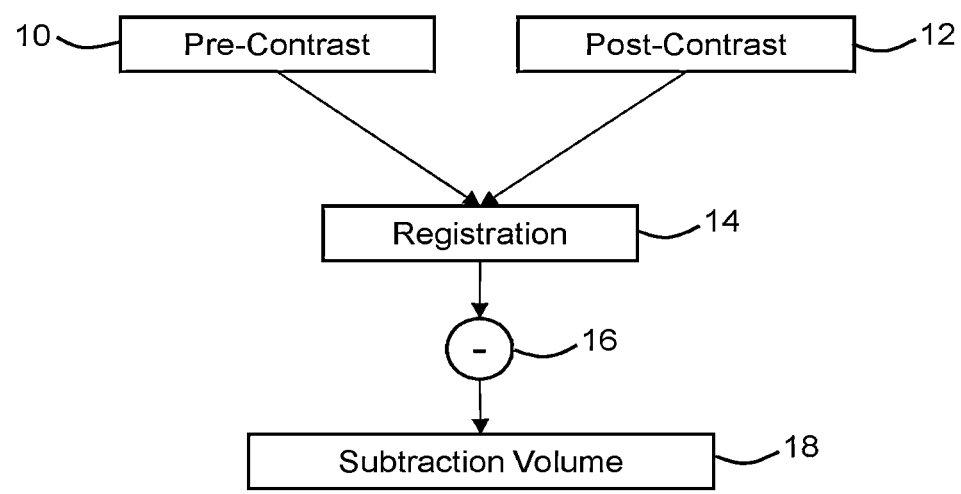
FIG. 1 is a flow chart illustrating in overview a subtraction process.
Figure 2:
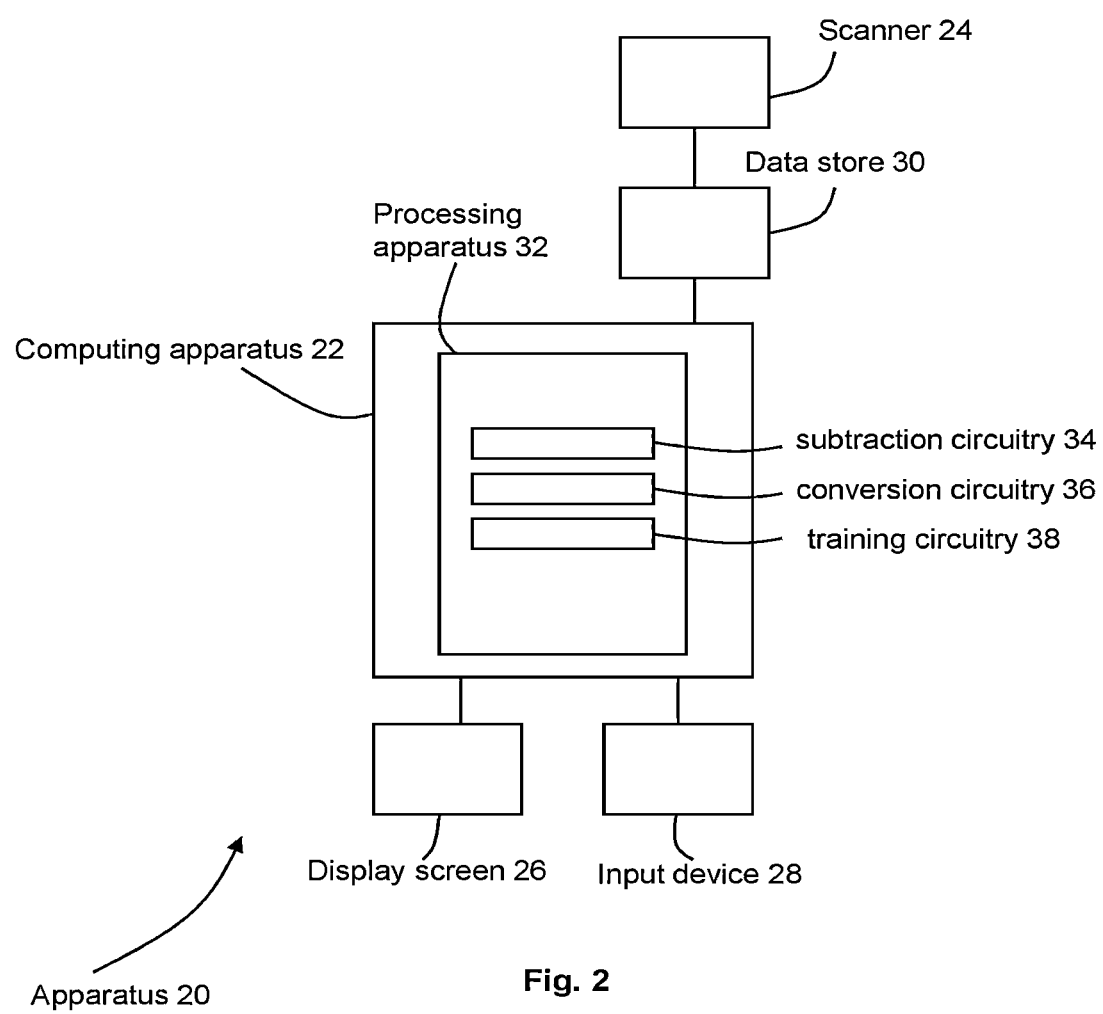
FIG. 2 is a schematic illustration of an apparatus in accordance with an embodiment.

A medical image processing apparatus 20 according to an embodiment is illustrated schematically in FIG. 2.

The medical image processing apparatus 20 comprises a computing apparatus 22, in this case a personal computer (PC) or workstation, which is connected to a scanner 24 via a data store 30.

The medical image processing apparatus 20 further comprises one or more display screens 26 and an input device or devices 28, such as a computer keyboard, mouse or trackball.

In the present embodiment, the scanner 24 is a computed tomography (CT) scanner. The scanner 24 is configured to generate image data that is representative of at least one anatomical region of a patient or other subject. The image data comprises a plurality of voxels each having a corresponding data value. In the present embodiment, the data values are representative of CT intensity in Hounsfield units (HU). The scanner is used to obtain a 3D scanogram without a contrast agent, and a post-contrast volume in which blood vessels are enhanced by presence of a contrast agent.

In other embodiments, the scanner 24 may be configured to obtain two-, three- or four-dimensional image data in any imaging modality. For example, the scanner 14 may comprise a magnetic resonance (MR) scanner, computed tomography (CT) scanner, cone-beam CT scanner, positron emission tomography (PET) scanner, X-ray scanner, or ultrasound scanner. Any suitable method may be used to enhance a sub-region of an anatomical region, for example to enhance vessels, one or more organs, or at least part of a digestive tract.

In the present embodiment, image data sets obtained by the scanner 24 are stored in data store 30 and subsequently provided to computing apparatus 22. In an alternative embodiment, image data sets are supplied from a remote data store (not shown). The data store 30 or remote data store may comprise any suitable form of memory storage. In some embodiments, the medical image processing apparatus 20 is not coupled to any scanner.

Computing apparatus 22 comprises a processing apparatus 32 for processing of data. The processing apparatus comprises a central processing unit (CPU) and Graphical Processing Unit (GPU). The processing apparatus 32 provides a processing resource for automatically or semi-automatically processing medical image data sets. In other embodiments, the data to be processed may comprise any image data, which may not be medical image data.

The processing apparatus 32 includes subtraction circuitry 34 configured to perform a subtraction process; conversion circuitry 36 configured to transform 3D scanogram data into synthetic pre-contrast data; and training circuitry 38 configured to train a model to be used in the transforming of the 3D scanogram data.

In the present embodiment, the circuitries 34, 36, 38 are each implemented in the CPU and/or GPU by means of a computer program having computer-readable instructions that are executable to perform the method of the embodiment. In other embodiments, the circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 2 for clarity.

Figure 3:
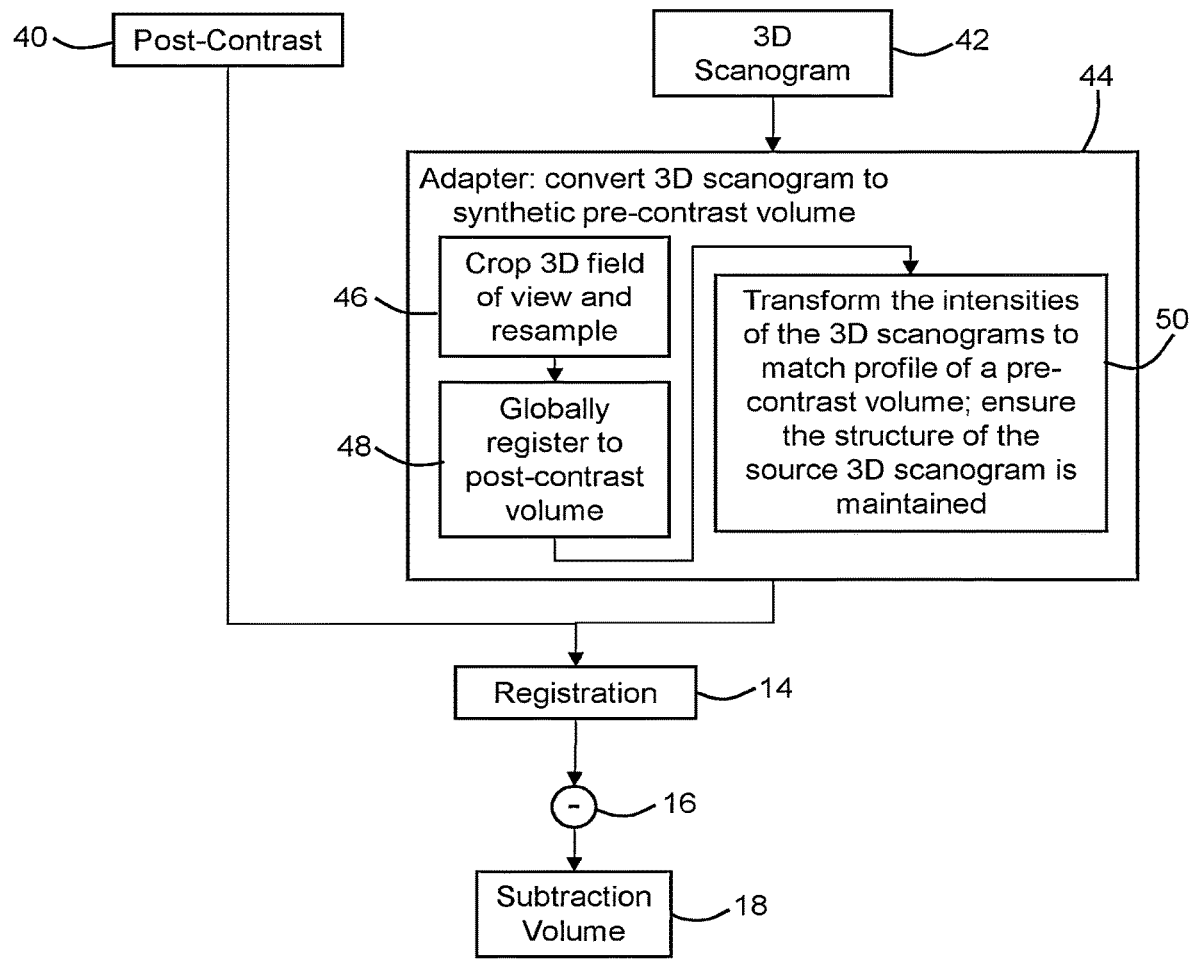
FIG. 3 is a flow chart illustrating in overview a subtraction method in accordance with an embodiment.

FIG. 3 is a flow chart illustrating in overview a method of an embodiment. Apparatus is configured to perform the method of FIG. 3. In other embodiments, any suitable apparatus or apparatuses may be used to perform the method of FIG. 3. In the method of FIG. 3, CT image data is obtained which comprises 3D scanogram image data. The 3D scanogram image data is transformed so that it resembles pre-contrast image data. The transforming of the 3D scanogram image data may also be described as correcting of the 3D scanogram image data to obtain corrected CT image data. A subtraction procedure is performed in which the corrected CT image data and a set of CT angiography image data is subtracted.

At stage 40, the subtraction circuitry 34 receives a post-contrast volume, for example from the data store 30 or another data store. The post-contrast volume may also be referred to as a contrast volume or as a CT angiography volume. The post-contrast volume has been obtained by using the CT scanner 24 to scan a target region of the body of a patient or other subject with a contrast agent present. In the embodiment of FIG. 3, the target region is the lungs. The post-contrast volume is a CT image data set comprising a plurality of voxels each having a corresponding data value.

At stage 42, the conversion circuitry 36 receives a 3D scanogram, for example from data store 30 or from another data store. The 3D scanogram may also be referred to as a full raw scanogram or as a source scanogram. The 3D scanogram has been obtained by using the CT scanner 24 to perform a three-dimensional scan of a region of the body of the patient or other subject without a contrast agent present. The 3D scanogram may be used in positioning the patient before further scans are performed.

In the embodiment of FIG. 3, the CT scanner 24 has obtained the 3D scanogram before the contrast agent is added, which is before the post-contrast volume was obtained. The region scanned in the 3D scanogram is larger than the target region. In the embodiment of FIG. 3, the region scanned to obtain the 3D scanogram is the torso of the patient or other subject. The 3D scanogram is a CT image data set comprising a plurality of voxels each having a corresponding data volume.

The 3D scanogram has been acquired by the CT scanner 24 using a first scan setting and the post-contrast volume has been acquired by the CT scanner 24 using a second, different scan setting. The first scan setting may also be referred to as a source scan setting. The second scan setting may also be referred to as a target scan setting. Each scan setting comprises a set of parameters which may be described as scan and reconstruction parameters, which may include for example field of view, resolution, dose, tube current, helical pitch and/or filter parameters.

In the embodiment of FIG. 3, the first scan setting has a larger field of view than the second scan setting, such that the 3D scanogram scans all or most of the torso and the post-contrast volume is limited to a target region around the lungs.

The first scan setting uses a lower radiation dose than the second scan setting. In the embodiment of FIG. 3, the 3D scanogram is a low dose CT scan in which silver is used to filter out low-energy photons. A beam-shaping energy filter leverages the photon-attenuating properties of silver to remove low energy photons from a polychromatic X-beam. A resulting energy spectrum may be optimized for lung cancer screening.

The 3D scanogram has a different intensity profile from the post-contrast scan due to the filtering of low-energy photons in the 3D scanogram which is not present in the second scan setting.

The first scan setting may use a lower tube current than the second scan setting, which may affect signal to noise values of the 3D scanogram.

The first scan setting has a lower resolution than the second scan setting. In the embodiment of FIG. 3, the acquisition of the 3D scanogram by the CT scanner 24 comprises obtaining a plurality of 2D image slices having a first resolution, for example 1 mm per pixel. The acquisition of the post-contrast volume by the CT scanner 24 comprises obtaining a plurality of 2D image slices having a second, higher resolution, for example, 0.5 mm per pixel.

Furthermore, a helical pitch of the acquisition is different for the 3D scanogram than for the post-contrast volume. Typically, a higher helical pitch results in lower image quality, but decreased dose, and a lower helical pitch results in higher image quality, but increased dose. A 3D scanogram will typically have higher helical pitch that a post-contrast scan because it is a low dose, lower quality scan than the post-contrast scan.

For each scan, resampling is performed to obtain an isotropic volume having a voxel spacing that matches the 2D pixel spacing.

In other embodiments, any suitable difference or differences between the first and second scan setting may be present. For example, in some embodiments the first and second scan settings comprise different reconstruction parameters. A reconstruction kernel may be different between the first scan setting and second scan setting. Different reconstruction kernels may have a tangible impact on resulting images.

In the method of FIG. 3, the 3D scanogram is leveraged as a low-dose pre-contrast scan for subtraction instead of obtaining a separate pre-contrast volume. Conventionally, when subtraction is to be performed, a pre-contrast volume is obtained before contrast is introduced. A conventional pre-contrast volume is typically obtained using the same field of view and pixel spacing as is used to obtain the post-contrast volume. Depending on a protocol used, one or more other factors, for example tube current, may be modified between the pre-contrast volume and post-contrast volume, for example in a case in which the pre-contrast volume is only used as a mask volume and not or other diagnostic purposes. The pre-contrast volume and post-contrast volume are then subtracted using a conventional subtraction algorithm.

The 3D scanogram obtained at stage 42 differs from a conventional pre-contrast volume. Firstly, a field of view of the 3D scanogram does not match an expected FOV of a conventional pre-contrast volume. A pre-contrast volume may be expected to cover the same target region as the post-contrast volume. The 3D scanogram typically covers a larger region.

The 3D scanogram has spectral differences when compared to a conventional pre-contrast volume. In the embodiment of FIG. 3, low energy photons are filtered out in the 3D scanogram. Spectral differences may mean that the 3D scanogram and a conventional pre-contrast volume would have different intensity values, for example HU values, for the same tissue.

If the 3D scanogram were to be used in place of a pre-contrast volume in a conventional subtraction algorithm, it is to be expected that a poor subtraction result may be achieved due to the differences between the 3D scanogram and the pre-contrast volume. Direct use of the 3D scanogram in a subtraction algorithm may result in poor registration and a bad subtraction. The resulting subtraction volume may not product a good result. Important diagnostic signals may be missing, for example a diagnostic signal for low perfusion.

In the method of FIG. 3, stage 44 comprises using an adapter to convert the 3D scanogram into a CT image data set that is similar to a conventional pre-contrast volume. The CT image data set obtained by converting the 3D scanogram may be referred to as a synthetic pre-contrast volume. By converting the 3D scanogram into a synthetic pre-contrast volume, it may be possible to use a conventional subtraction algorithm to obtain subtraction data from the 3D scanogram and post-contrast volume without additionally obtaining a conventional pre-contrast volume. The converting of the 3D scanogram may be described as a style transfer or image to image translation. The 3D scanogram has a first image style, which is transformed into a second, different image style. The second image style is characteristic of conventional pre-contrast image data. For example, the second image style comprises a resolution and field of view that are typical of pre-contrast image data. The second image style comprises a distribution of intensity values that is similar to that of pre-contrast image data. The first image style may also be described as a source style. The second image style may also be described as a target style.

Stage 44 comprises three sub-stages 46, 48 and 50 which each address respective differences between the 3D scanogram and a conventional pre-contrast volume.

At sub-stage 46, the conversion circuitry 36 crops the field of view of the 3D scanogram to match an expected field of view of a pre-contrast volume. The cropping comprises reducing the field of view in one or more coordinate axes. The expected field of view of the pre-contrast volume may be the same as a field of view of the post-contrast volume. Any method for localizing target anatomy in a volume may be used.

In some embodiments, the conversion circuitry 36 knows that the 3D scanogram and post-contrast volume were obtained by scanning the same patient in the same scanner 24. The conversion circuitry 36 assumes that a coordinate space of the 3D scanogram is the same as a coordinate space of the post-contrast volume. The conversion circuitry 36 uses coordinates of the target region scanned in the post-contrast volume to crop the 3D scanogram to cover a corresponding volume. In other embodiments, any suitable method may be used to crop the 3D scanogram. For example, cropping methods as described below with reference to FIG. 8 or FIG. 9 may be used.

The conversion circuitry 36 also resamples the 3D scanogram so that it has the same resolution as the post-contrast volume. Any suitable resampling method may be used.

At sub-stage 48, the conversion circuitry 36 globally registers the 3D scanogram to the post-contrast volume. The global registration may be performed on the original 3D scanogram or on the cropped and/or resampled 3D scanogram. The global registration may comprise a rigid alignment of images. Any suitable method of localizing target anatomy in a volume may be used to perform the global registration. For example, a global registration may be as described below with reference to FIG. 8.

At sub-stage 50, the conversion circuitry 36 transforms the intensities of the 3D scanogram to match an intensity profile of a pre-contrast volume. The method used to transform the intensities is such that a structure of the original 3D scanogram is maintained. For example, intensities of the 3D scanogram may be changed without changing a position of any anatomical boundaries within the 3D scanogram. Sub-stage 50 may be performed on the original 3D scanogram or on a cropped, resampled and/or registered version of the 3D scanogram. Examples of methods used for sub-stage 50 are described below with reference to FIGS. 4, 5, 6 and 7. In other embodiments, any image-to-image translation method may be used that performs style transfer and ensures structural information from the input image is maintained.

Sub-stages 46, 48 and 50 may be performed in any suitable order. In some embodiments, one or more of sub-stages 46, 48 and 50 may be omitted. In some embodiments, two or more of sub-stages 46, 48 and 50 may be combined into a single sub-stage.

At the end of stage 44, the conversion circuitry 36 outputs synthetic pre-contrast volume that has been obtained by converting the 3D scanogram to resemble a target volume which is a conventional pre-contrast volume. The synthetic pre-contrast data may also be described as corrected CT image data.

The converting of the 3D scanogram at stage 44 is configured to match the expected physical representation of the target volume by matching field of view, resolution and content. The converting of the 3D scanogram is configured to match the intensity profiles of different tissues seen in the target volume. The converting of the 3D scanogram is configured to match the original 3D scanogram's structural information.

The conversion circuitry 36 passes the synthetic pre-contrast volume to the subtraction circuitry 34. The subtraction circuitry 34 performs a subtraction method in which the synthetic pre-contrast volume is used in place of a real pre-contrast volume.

At stage 14, the subtraction circuitry 34 performs a registration to align the synthetic pre-contrast volume and the post-contrast volume. Any suitable registration may be used, for example any suitable non-rigid registration method.

At stage 16, the subtraction circuitry 34 subtracts the registered synthetic pre-contrast volume and post-contrast volume to obtain a subtraction volume 18. In the embodiment of FIG. 3, the subtraction circuitry 34 renders a subtraction image from the subtraction volume 18. The subtraction image is displayed to a user, for example using display screen 26. In other embodiments, the subtraction image may not be displayed. In some embodiments, the subtraction volume 18 is input to a further algorithm for further processing.

Stages 14 and 16 may be similar or identical to stages used in a conventional subtraction algorithm in which a pre-contrast volume and post-contrast volume are subtracted. The synthetic pre-contrast volume is used in place of a captured pre-contrast in subtraction algorithms.

By using an adapter to turn a 3D scanogram into a synthetic pre-contrast, better subtraction results may be achieved than if the full raw 3D scanogram and post-contrast volume were to be subtracted. For example, vasculature may be more visible.

Turning a 3D scanogram into a synthetic pre-contrast by adjusting intensity values may provide better results than just cropping and registering the 3D scanogram without adjusting intensity values.

By using a synthetic pre-contrast volume, a subtraction image may be obtained at a lower dose than a conventional subtraction image that uses a separate pre-contrast volume in addition to a scanogram and post-contrast volume. A 3D scanogram may be used as a low-dose pre-contrast scan for subtraction.

Low dose 3D volumes may be provided to the same level as a full-dose pre-contrast scan. In some circumstances, a synthetic pre-contrast volume derived from a 3D scanogram may be used as a direct replacement for a full-dose pre-contrast scan of the same patient. This may enable the use of the 3D scanogram in situations in which a non-contrast scan may usually be used.

Figure 4:
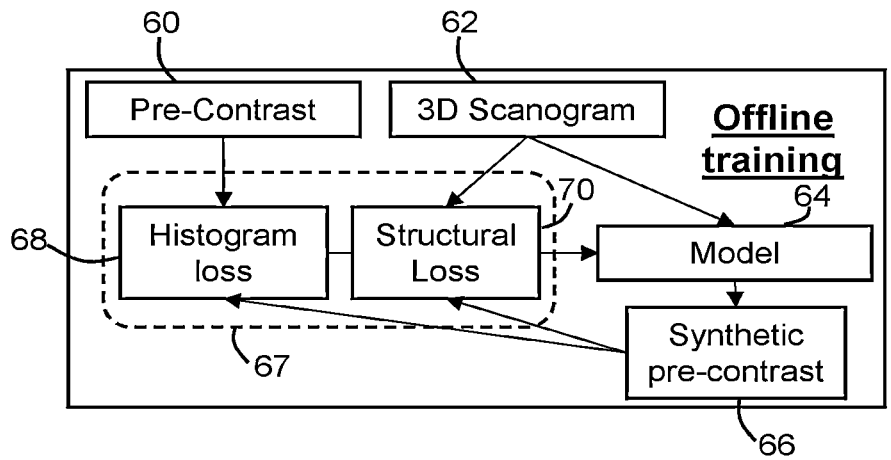
FIG. 4 is a flow chart illustrating in overview a method of training a model in accordance with an embodiment.

FIG. 4 is a flow chart illustrating in overview a method of training an adapter model 64 which may be used at stage 44 of the method of FIG. 3. The adapter model is trained to perform a direct prediction of a synthetic pre-contrast volume from a 3D scanogram. The training may be described as offline training because it is performed using a predetermined training data cohort and is used to train the adapter model 64 on training data before the adapter model 64 is applied to new data, for example to a 3D scanogram for which no corresponding pre-contrast volume exists.

The adapter model 64 comprises a deep learning model. The deep learning model may be a neural network, for example a fully convolutional neural network. A fully convolutional neural network may allow different image sizes to be processed and the network to learn the importance of spatial input. The network in the embodiment of FIG. 4 produces an output that is the same size as the original input. The network used may be similar to a type of network used in semantic segmentation, for example a UNet.

The adapter model 64 is trained using a training data cohort comprising a plurality of training data sets, each training data set comprising 3D scanogram data for a subject paired with pre-contrast data for the same subject. The adapter model 64 is trained using a first loss based on anatomical structure and a second loss based on image intensity.

The training circuitry 38 receives a pre-contrast volume 60 from a training data set. The training circuitry 38 receives a corresponding 3D scanogram 62 from the same training data set. The training circuitry 38 inputs the 3D scanogram 62 into an adapter model 64 that is to be trained. The adapter model 64 outputs a synthetic pre-contrast volume 66.

To train the adapter model 64, a loss 67 is calculated. The adapter model 64 of FIG. 4 is a deep learning model trained using a loss 67 comprising two loss components 68, 70 as described below. The loss components 68, 70 may be similar to those described in Mor Avi-Aharon, Assaf Arbelle, and Tammy Riklin Raviv, DeepHist: Differentiable joint and color histogram layers for image-to-image translation, arXiv preprint arXiv: 2005.03995, 2020, which is hereby incorporated by reference. In other embodiments, any suitable loss may be used to train an adapter model.

A first loss component of the loss 67 is a structural loss 70 which is calculated by comparing the synthetic pre-contrast data 66 to the 3D scanogram data 62, which is image data acquired using the first scan setting. The first loss component may also be described as a first loss.

It is important that structure, for example anatomical structure, is not lost when converting the 3D scanogram data 62 to synthetic pre-contrast data 66. The structural loss 70 measures a change in structure between the 3D scanogram data 62 and synthetic pre-contrast data 66. The structural loss 70 is smaller when the structure of the synthetic pre-contrast data 66 is more similar to the structure of the 3D scanogram data 62. The structural loss 70 may comprise, for example, a mutual information loss or structural similarity index.

A second loss component of the loss 67 is a histogram loss 68 which is calculated as a loss between a histogram of the synthetic pre-contrast data 66 and a histogram of the pre-contrast data 60 of the training data set, which is image data acquired using the second scan setting. The second loss component may also be described as a second loss. In the embodiment of FIG. 4, the second loss component is based on the histogram loss described in Mor Avi-Aharon, Assaf Arbelle, and Tammy Riklin Raviv, DeepHist: Differentiable joint and color histogram layers for image-to-image translation, arXiv preprint arXiv: 2005.03995, 2020. The loss uses the Earth Mover's Distance between the histogram of the synthetic pre-contrast data 66 and the histogram the pre-contrast data 60. In other embodiments, any function that provides a loss function between two histograms may be used, for example KL Divergence.

The histogram loss 68 is representative of a distance between actual intensities of the pre-contrast data 60 and the intensities that are generated by the adapter model for the synthetic pre-contrast data 66. For example, the histogram loss 68 may be obtained by comparing HU values for each of the voxels in the pre-contrast data 60 and synthetic pre-contrast data 66. The histogram loss 68 is smaller when the synthetic pre-contrast data 66 is more similar to the pre-contrast data 60.

The method of FIG. 4 is repeated many times with many training data sets to train the adapter model 64. Weights of the adapter model 64 are adjusted to optimize the loss 67. Once training is complete, the weights of the adapter model 64 may be locked before the adapter model 64 is used in the method of FIG. 3.

By using both a histogram loss 68 and a structural loss 70, the adapter model 64 is trained to change intensities of the 3D scanogram to be similar to the pre-contrast data while keeping the structure of the 3D scanogram.

Once trained, the adapter model 64 may be used to perform at least part of the adapter stage 44 of the method of FIG. 3, in which 3D scanogram data is converted to synthetic pre-contrast data. For example, the adapter model 64 may be used to perform sub-stage 68.

Figure 5:
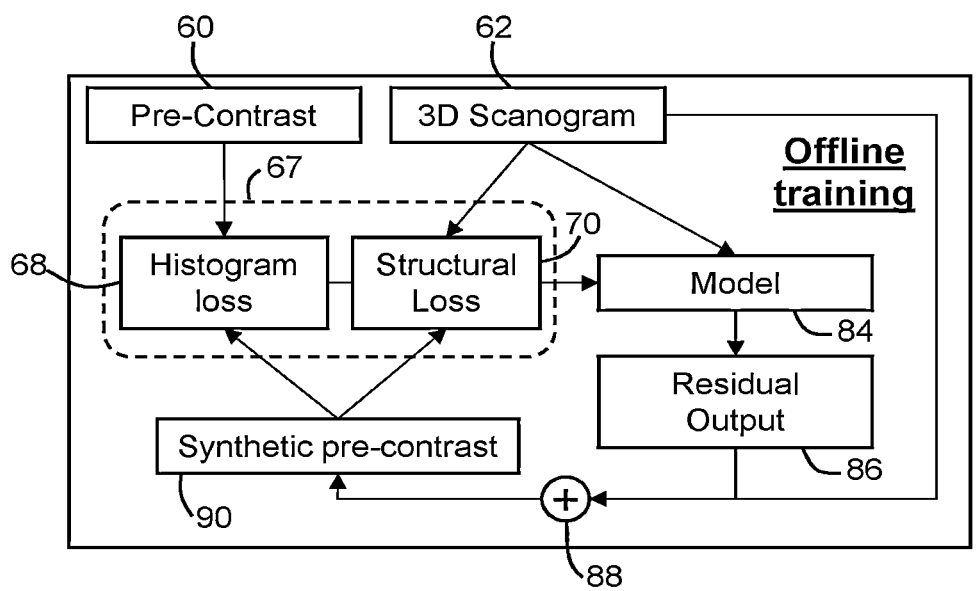
FIG. 5 is a flow chart illustrating in overview a method of training a model in accordance with an alternative embodiment.

FIG. 5 is a flow chart illustrating in overview a method of training an alternative adapter model 84 which may be used at stage 44 of the method of FIG. 3. The alternative adapter model 84 comprises a deep learning model. The deep learning model may be a neural network, for example a fully convolutional neural network. The network in the embodiment of FIG. 5 produces an output that is the same size as the original input. The network used may be similar to a type of network used in semantic segmentation, for example a UNet.

Instead of performing a direct prediction of a synthetic pre-contrast volume from a 3D scanogram, the adapter model 84 predicts a residual which is representative of a difference between the 3D scanogram and the synthetic pre-contrast. The training may be described as offline training. The training is used to train the adapter model 84 on training data before the adapter model 84 is applied to new data, for example to a 3D scanogram for which no corresponding pre-contrast volume exists.

The adapter model is trained using a training data cohort comprising a plurality of training data sets, each training data set comprising 3D scanogram data for a subject paired with pre-contrast data for the same subject.

The training circuitry 38 receives a pre-contrast volume 60 from a training data set. The training circuitry 38 receives a corresponding 3D scanogram 62 from the same training data set. The training circuitry 38 inputs the 3D scanogram 62 into an adapter model 84 that is to be trained. The adapter model 84 outputs a residual output 86.

At stage 88, the training circuitry 38 adds the residual output to the 3D scanogram data 62 to obtain synthetic pre-contrast data 90.

A loss 67 is calculated from the synthetic pre-contrast data 90, pre-contrast data 60 and 3D scanogram data 62 in the same way as described above with reference to FIG. 4. In the embodiment of FIG. 5, the loss 67 comprises a histogram loss 68 and structural loss 70 as described above. In other embodiments, any suitable loss may be used.

The method of FIG. 5 is repeated many times with many training data sets to train the adapter model 84. Weights of the adapter model 84 are adjusted to optimize the loss 67. Once training is complete, the weights of the adapter model 84 may be locked before the adapter model 84 is used in the method of FIG. 3.

Once trained, the adapter model 84 may be used to perform at least part of the adapter stage 44 of the method of FIG. 3, in which 3D scanogram data is converted to synthetic pre-contrast data. For example, the adapter model 64 may be used to perform sub-stage 68. The adapter model 84 is trained to obtain from 3D scanogram data 62*a* residual output 86 which can be combined with the 3D scanogram data 62 to obtain synthetic pre-contrast data 90, while retaining structure of the 3D scanogram data.

Figure 6:
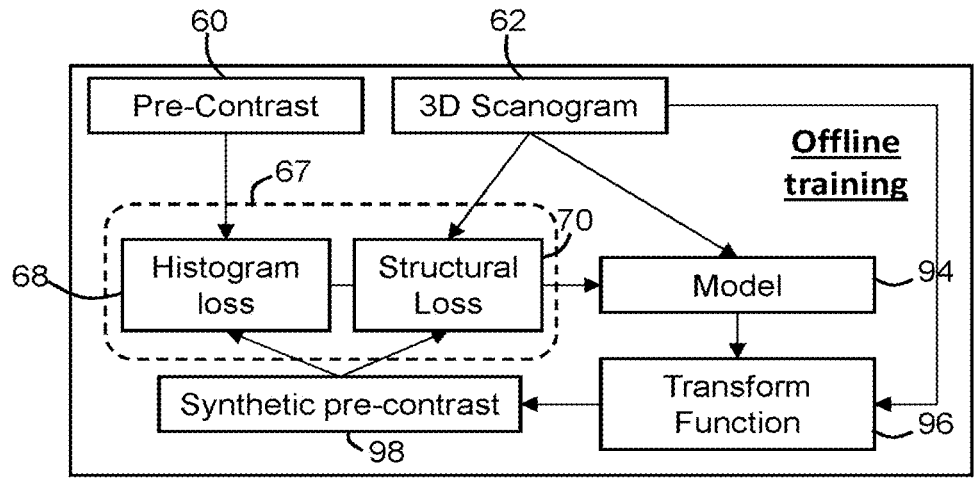
FIG. 6 is a flow chart illustrating in overview a method of training a model in accordance with a further embodiment.

FIG. 6 is a flow chart illustrating in overview a method of training a further adapter model 94 which may be used at stage 44 of the method of FIG. 3. The further adapter model 94 comprises a deep learning model. The deep learning model may be a neural network, for example a convolutional or fully convolutional neural network. An output size of the further adapter model 84 is fixed to parameters of a transfer function so uses a fixed size input.

In the method of FIG. 6, an adapter model 94 is trained which predicts a transform function 96 to be applied to 3D scanogram data to obtain synthetic pre-contrast data. The transform function 96 may also be described as a transformation function.

The training may be described as offline training. The training is used to train the adapter model 94 on training data before the adapter model 94 is applied to new data, for example to a 3D scanogram for which no corresponding pre-contrast volume exists.

The adapter model 94 is trained using a training data cohort comprising a plurality of training data sets, each training data set comprising 3D scanogram data for a subject paired with pre-contrast data for the same subject.

The training circuitry 38 receives a pre-contrast volume 60 from a training data set. The training circuitry 38 receives a corresponding 3D scanogram 62 from the same training data set. The training circuitry 38 inputs the 3D scanogram 62 into an adapter model 94 that is to be trained. The adapter model 94 outputs a transform function 96.

The transform function 96 may be a function that converts intensity values in the 3D scanogram 62 into different intensity values to be used in the synthetic pre-contrast data 66. A range of possible intensity values for 3D scanogram data may be obtained based on a range obtainable by the scanner 24, or based on intensities of the training data cohort, or by any suitable method. The transform function 96 may be a function that relates each intensity value in the range of possible intensity values for 3D scanogram data to a respective transformed intensity value for use in synthetic pre-contrast data.

The training circuitry 38 uses the transform function 96 to convert the 3D scanogram 62 into synthetic pre-contrast data 98.

A loss 67 is calculated from the synthetic pre-contrast data 98, pre-contrast data 60 and 3D scanogram data 62 in the same way as described above with reference to FIG. 4. In the embodiment of FIG. 6, the loss 67 comprises a histogram loss 68 and structural loss 70 as described above. In other embodiments, any suitable loss may be used.

The method of FIG. 6 is repeated many times with many training data sets to train the adapter model 94. Weights of the adapter model 94 are adjusted to optimize the loss 67. Once training is complete, the weights of the adapter model 94 may be locked before the adapter model 94 is used in the method of FIG. 3.

Once trained, the adapter model 94 may be used to perform at least part of the adapter stage 44 of the method of FIG. 3, in which 3D scanogram data is converted to synthetic pre-contrast data. For example, the adapter model 94 may be used to perform sub-stage 68. The adapter model 94 is trained to obtain from 3D scanogram data a transform function 96 which can be applied to the 3D scanogram data 62 to obtain synthetic pre-contrast data 98, while retaining structure of the 3D scanogram data.

In some circumstances, a transform function may provide regularization of the conversion of the 3D scanogram data into synthetic pre-contrast data. For example, synthetic pre-contrast data obtained using a transform function may be smoother than synthetic pre-contrast data obtained using a direct prediction method. Synthetic pre-contrast data obtained using a transform function may be more consistent than synthetic pre-contrast data obtained using a direct prediction method. Synthetic pre-contrast data obtained using a transform function may be less noisy than synthetic pre-contrast data obtained using a direct prediction method.

Figure 7:
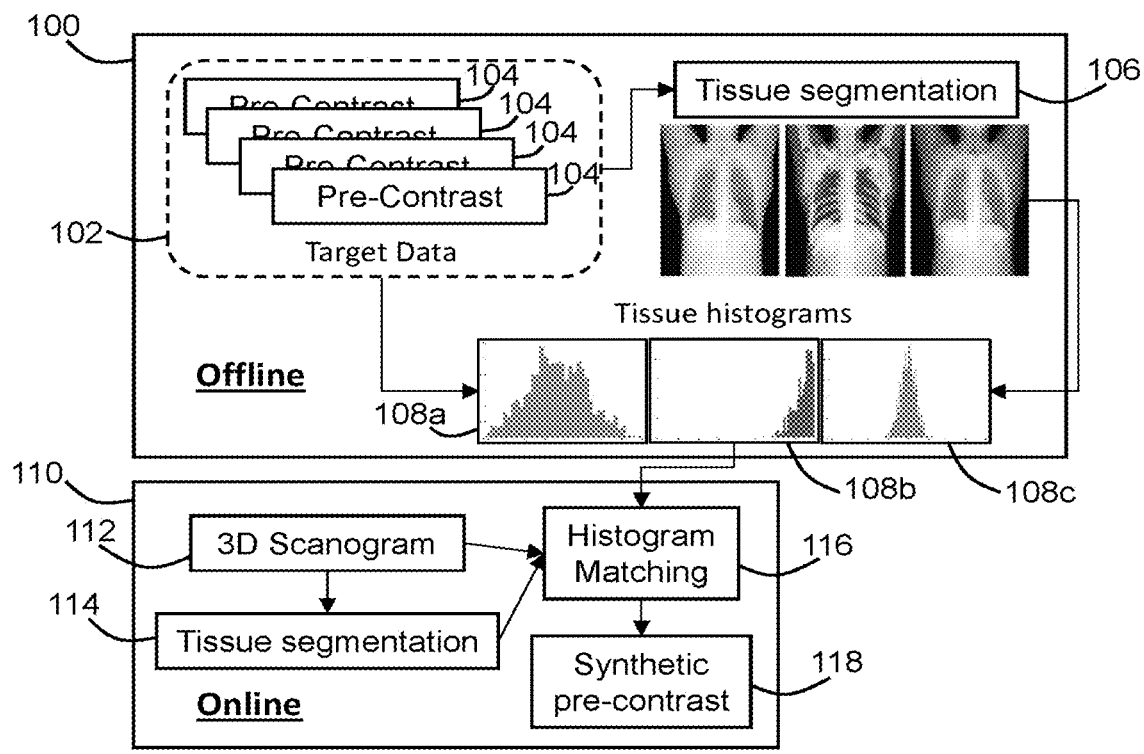
FIG. 7 is a flow chart illustrating in overview a histogram matching method in accordance with an embodiment.

FIG. 7 is a flow chart illustrating in overview a method in which tissue histogram matching is used to convert 3D scanogram data to synthetic pre-contrast data. No deep learning model is used in the method of FIG. 7.

An offline process 100 is performed to obtain a plurality of tissue histograms that are representative of intensity values for different tissue types. The training circuitry 38 receives target data 102 which comprises a cohort of pre-contrast data sets 104. The pre-contrast data sets 104 may be training data which is obtained from pre-contrast scans of a plurality of patients or other subjects.

The training circuitry 38 performs a tissue segmentation 106 of each of the pre-contrast data sets 104. The tissue segmentation 106 comprises segmenting the pre-contrast data sets 104 to obtain a plurality of segmented regions, each representative of a different tissue type. For example, the segmented regions may include lung tissue, bone tissue and muscle tissue respectively. Any suitable segmentation method may be used. For example, the segmentation method may comprise one or more of an edge-based segmentation method, a region growing segmentation method, a texture-based segmentation method, an atlas-based segmentation, a model-based segmentation method (for example, shape models), another neural network.

In some embodiments, the segmented regions include only tissues of interest, while parts of the pre-contrast data sets that do not include tissues of interest are not segmented. For example, the tissues that are segmented may be tissues that are involved in a target algorithm.

The training circuitry 38 calculates a respective histogram 108a, 108b, 108c for each of the tissue types. Histograms 108a, 108b, 108c may be described as reference histograms. For each tissue type, the training circuitry 38 identifies the segmented regions for that tissue type. The training circuitry 38 then calculates a histogram 108a, 108b, 108c of intensity values for the segmented regions for that tissue type across the pre-contrast data sets in the cohort. By combining intensity values for a tissue type across multiple pre-contrast data sets, a typical or average histogram for each tissue type may be obtained.

An output of the offline process 100 is the set of tissue histograms 108a, 108b, 108c, each of which comprises respective histogram data for a respective tissue type.

The tissue histograms 108a, 108b, 108c are used to perform an online process 110 which comprises tissue histogram matching based on the target data 102. The online process 110 is performed on new 3D scanogram data that was not used in the offline process 100. The online process 110 may be performed as part of the adapter 44 of FIG. 3, for example as part of sub-stage 50.

In the online process 110, the conversion circuitry 36 receives a 3D scanogram 112 which is representative of a patient or other subject. The conversion circuitry 36 also receives the histograms 108a, 108b, 108c that were determined in the offline process 100.

The conversion circuitry 36 performs a segmentation 114 of a plurality of tissue types in the 3D scanogram 112. Any suitable segmentation method may be used.

In the embodiment of FIG. 7, the tissue types that are segmented in the 3D scanogram are the same as the tissue types that were segmented in the tissue segmentation 106. For example, the tissue types may be lung, bone and muscle.

The conversion circuitry 36 performs a histogram matching 116 using the tissue segmentation 114 and the histograms 108a, 108b, 108c. Histogram matching 116 transforms an image, or part of an image, so that a cumulative distribution function (CDF) of values in the transformed image, which can be computed from the histogram, matched a CDF of a target image. In the embodiment of FIG. 7, for each pixel value in a histogram of the 3D scanogram, a corresponding pixel value is found in a corresponding pre-contrast histogram where the value in the CDFs for both image matches. This provides a mapping from scanogram to target pre-contrast value. Such a mapping may be obtained for each of the segmented tissue types. In other embodiments, any suitable histogram matching method may be used.

An output of the histogram matching 116 is a set of synthetic pre-contrast data 118 that is obtained by converting the intensities of the 3D scanogram 112.

In other embodiments, histogram matching may be performed using whole images rather than segmented regions. However, using segmentation to find regions of given tissue types and obtaining a respective histogram for each of the tissue types may produce better results than histogram matching of whole images. Synthetic pre-contrast data produced by histogram matching of segmented tissue types may better match real pre-contrast data when compared to synthetic pre-contrast data produced by histogram matching of whole images.

Figure 8:
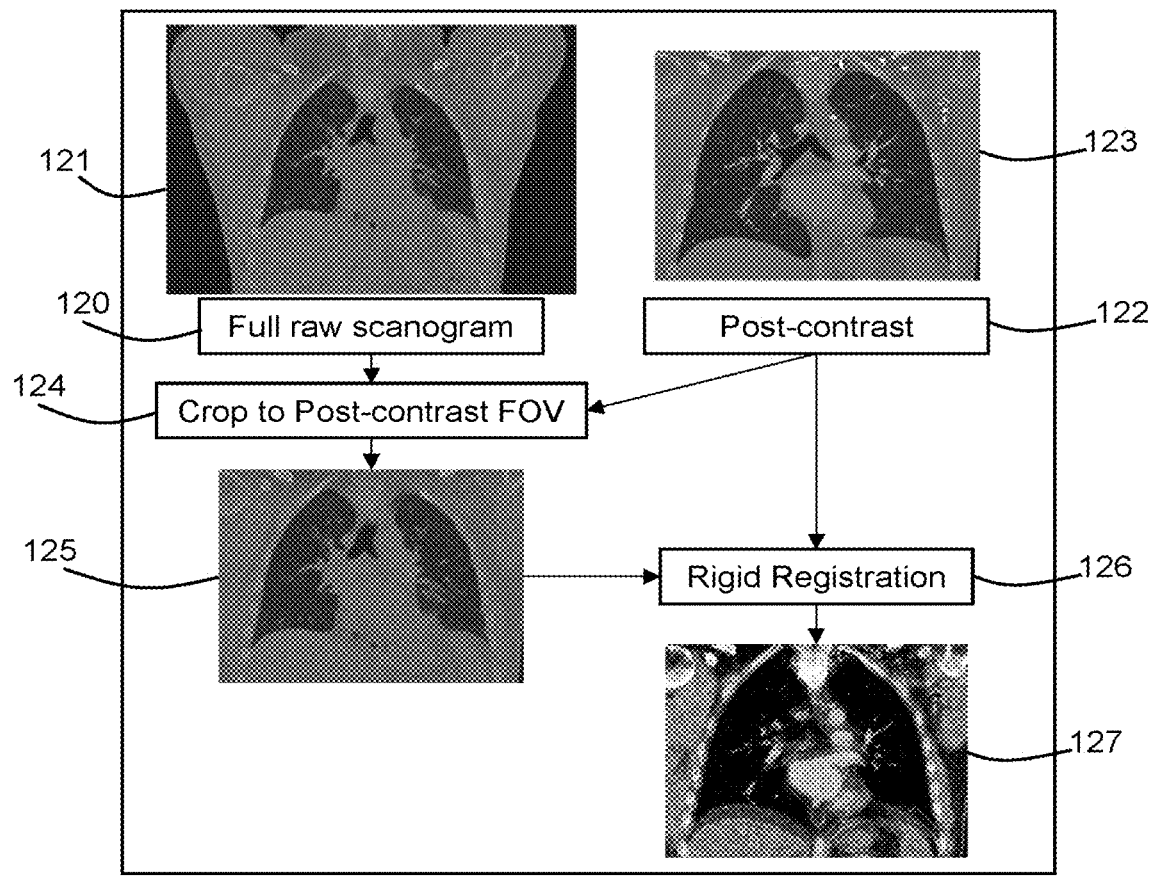
FIG. 8 is a flow chart illustrating in overview an image cropping and registration method in accordance with an embodiment.

FIG. 8 is a flow chart illustrating in overview a method of cropping and registering a 3D scanogram. The method of FIG. 8 may be used to perform part of adapter stage 44, for example sub-stages 46 and 48.

At stage 120, the conversion circuitry 36 receives a full raw 3D scanogram, for example from the data store 30 or an alternative data store. The full raw 3D scanogram comprises a scan of a wider region than a target region. In the example of FIG. 8, the wider region is the torso of the patient who is scanned. Image 121 is representative of the full raw 3D scanogram.

At stage 122, the conversion circuitry 36 receives a post-contrast volume, for example from the data store 30 or an alternative data store. The post-contrast volume is a scan of the target region. In the example of FIG. 8, the target region is the lungs. Image 123 is representative of the post-contrast volume. It can be seen that the target region is smaller than the region scanned in the 3D scanogram.

At stage 124, which may be performed as sub-stage 46 of the method of FIG. 3, the conversion circuitry 36 crops the full raw 3D scanogram to cover the same region as the post-contrast volume. The conversion circuitry 36 uses the post-contrast volume to determine an extent to which the full raw 3D scanogram is cropped. For example, the full raw 3D scanogram and post-contrast volume may be acquired in the same coordinate system. The conversion circuitry 36 may use coordinates of the post-contrast volume to determine coordinates to use in cropping the full raw 3D scanogram. Image 125 is representative of a cropped version of the 3D scanogram, which is cropped to the same target region as the post-contrast volume.

At stage 126, which may be performed as sub-stage 46 of FIG. 3, the conversion circuitry 36 performs a rigid registration of the cropped version of the full raw 3D scanogram and the post-contrast volume. Any suitable rigid registration may be used. Image 127 is representative of the cropped 3D scanogram registered with the post-contrast volume.

The method of FIG. 8 provides spatial adjustment using a post-contrast volume as reference.

Figure 9:
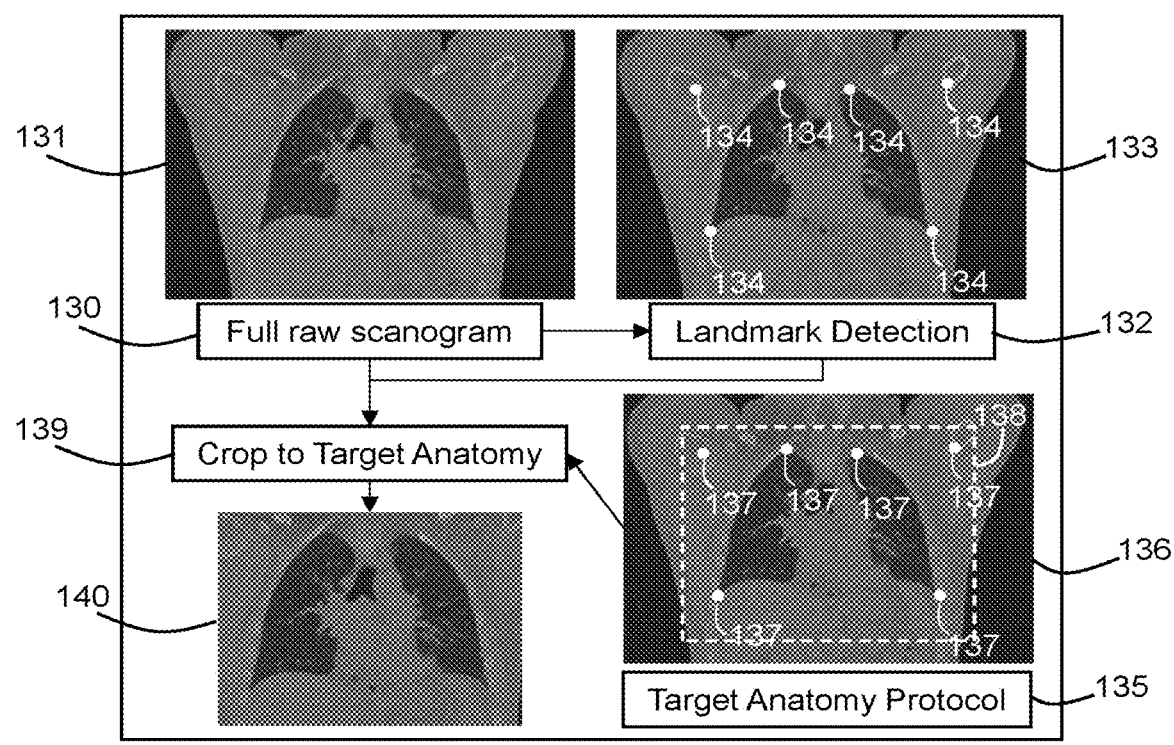
FIG. 9 is a flow chart illustrating in overview a further image cropping method in accordance with an embodiment.

FIG. 9 is a flow chart illustrating in overview a further method of cropping a 3D scanogram. The method of FIG. 9 may be used to perform part of adapter stage 44, for example sub-stage 46.

At stage 130, the conversion circuitry 36 receives a full raw 3D scanogram, for example from the data store 30 or an alternative data store. In the example of FIG. 9, the full raw 3D scanogram is a scan of the torso. Image 131 is representative of the full raw 3D scanogram.

At stage 132, the conversion circuitry 36 performs a landmark detection method to detect a plurality of anatomical landmarks within the full raw 3D scanogram. Anatomical landmarks may be recognizable points within the body's structure, for example well defined points on bones, organs or other anatomical structures. Image 133 is representative of the full raw 3D scanogram in which locations of six landmarks 134 have been detected.

In some embodiments, the method of landmark detection is as described in, for example, Mohammad A Dabbah, Sean Murphy, Hippolyte Pello, Romain Courbon, Erin Beveridge, Stewart Wiseman, Daniel Wyeth and Ian Poole, 'Detection and location of 127 anatomical landmarks in diverse CT datasets', Proc. SPIE 9034, Medical Imaging 2014: Image Processing, 903415 (Mar. 21, 2014), which is hereby incorporated by reference. In other embodiments, any landmark detection method may be used.

At stage 134, the conversion circuitry 36 receives a target anatomy protocol 156 from the data store 30 or from another data store. The target anatomy protocol 135 defines a target anatomy region in terms of anatomical landmarks. In the example of FIG. 9, the target anatomy is the lungs and the target anatomy region is a region encompassing the lungs. The target anatomy protocol 135 may comprise a reference medical image or reference atlas in which locations of landmarks are marked and a target anatomy region is defined with reference to the landmark locations. Image 136 is representative of a reference medical image or reference atlas in which landmarks 137 and target anatomy region 138 are defined.

The conversion circuitry 36 uses the anatomical landmarks detected at stage 132 and the target anatomy protocol 135 to crop the full raw 3D scanogram such that a resulting cropped scanogram is cropped to the target anatomy region. For example the landmarks of the target anatomy protocol may be registered with the landmarks of the 3D scanogram to map the target anatomy region of the target anatomy protocol onto the 3D scanogram. The 3D scanogram may then be cropped to the target anatomy region.

The method of FIG. 9 comprises a spatial adjustment using anatomical landmark detection. The spatial adjustment of FIG. 9 does not use a post-contrast volume as a reference. The spatial adjustment of FIG. 9 may be performed prior to capture of a post-contrast volume.

In embodiments, any of the methods of FIG. 4 to FIG. 9 may be used, alone or in combination, in converting a 3D scanogram into synthetic pre-contrast data. For example a cropping and registration method as described with reference to FIG. 8 may be combined with a model that is trained using the method of FIG. 4 to convert intensities.

In embodiments described above, a 3D scanogram is converted to synthetic pre-contrast data for use in subtraction. In other embodiments, medical image data of any suitable modality may be converted from a first image style to a second image style for use in an algorithm that is designed to work on medical image data having the second image style. Methods described above may be extended to a more general case or retargeting medical images for use in existing algorithms. Methods may be used for any algorithms that require retargeting of captured volumes to match target reconstruction parameters. The medical image data may be representative of any suitable anatomical region of any human or animal subject.

Figure 10:
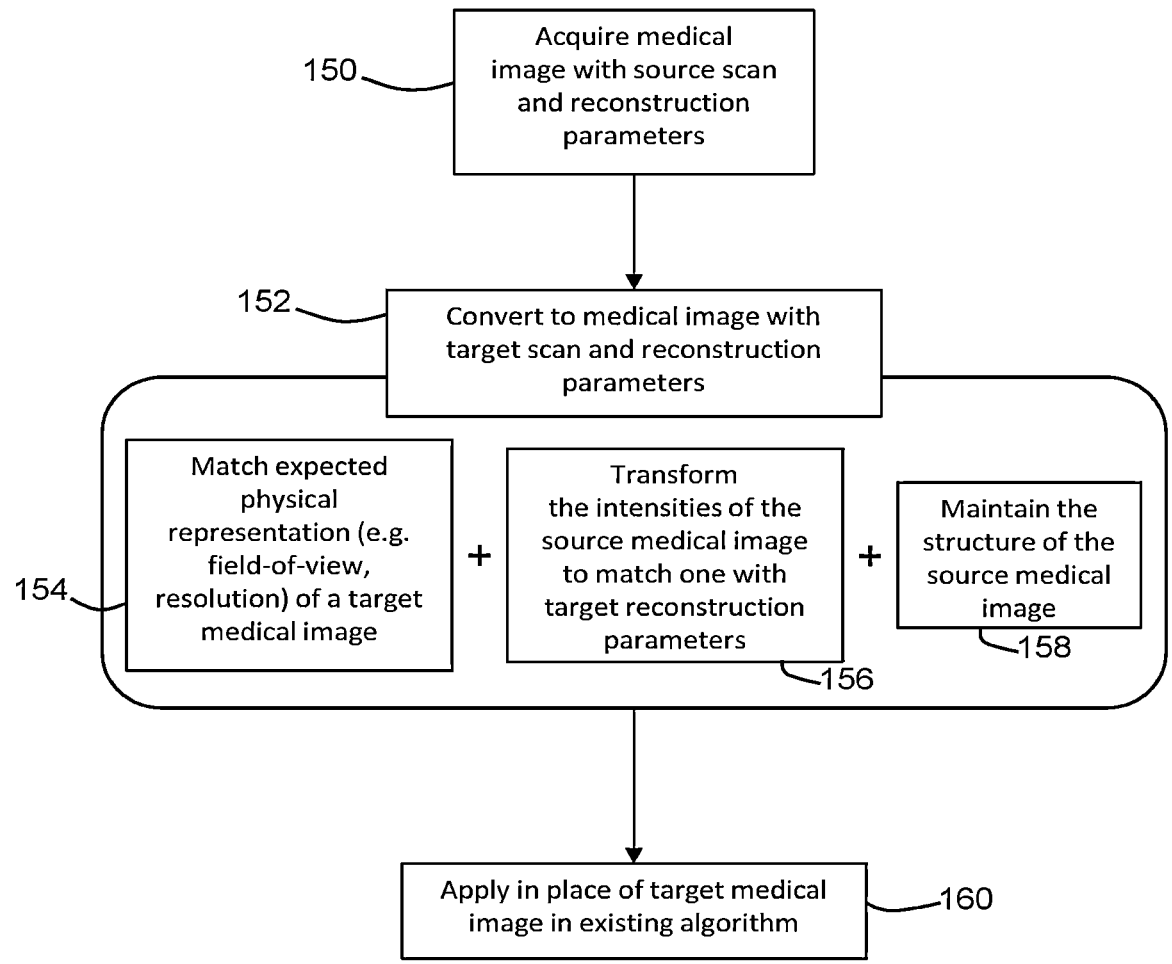
FIG. 10 is a flow chart illustrating in overview an image transformation method in accordance with an embodiment.

FIG. 10 is a flow chart illustrating in overview a method of a further embodiment, which is not specific to CT subtraction.

At stage 150, medical image data is acquired with a first scan setting. The medical image data has a first image style resulting from a set of source scan and reconstruction parameters, for example a field of view, resolution, dose, tube current, helical pitch and/or filter. The medical image data may also be described as a source medical image.

At stage 152, the medical image data is converted to corrected medical image data. The corrected medical image data has a second image style that is characteristic of data acquired with second scan and reconstruction parameters that are different from the first scan and reconstruction parameters. For example, there may be a different field of view, resolution, dose, tube current, helical pitch and/or filter.

Stage 152 comprises three sub-stages 154, 156, 158. Sub-stage 154 comprises adjusting the medical image data to match an expected physical representation (for example, field-of-view, resolution) of a target medical image. Sub-stage 156 comprises transforming intensities of the medical image data to match image data having target reconstruction parameters. Sub-stage 158 comprises maintaining the structure of the source medical image. Sub-stages 154, 156 and 158 may be performed in any suitable order. Two or more of sub-stages 154, 156, 158 may be combined into a single sub-stage.

Stage 152 may comprise methods described above with reference to any of FIGS. 3 to 9.

An output of stage 152 is a set of corrected medical image data which is converted to resemble medical image data acquired using different parameters from those used to acquire the medical image data.

At stage 160, the corrected medical image data is applied in place of a target medical image in an existing algorithm.

In some embodiments, the medical image data is 3D scanogram data and the corrected medical image is synthetic non-contrast CT data but the existing algorithm is not a subtraction. The existing algorithm may be any algorithm in which spectral differences between a scanogram and non-contrast data may cause issues if the algorithm were to be applied directly to scanogram data. For example, the algorithm may be an algorithm for calcification detection or calcium scoring. The algorithm may be well tuned to work on expected HU values in a pre-contrast image. By converting the 3D scanogram data to synthetic non-contrast data, the algorithm may be applied to 3D scanogram data.

In embodiments described above, the medical image data and corrected medical image data each comprise 3D data. In other embodiments, any suitable n-dimensional data may be used, for example 2-dimensional, 3-dimensional or 4-dimensional data.

Certain embodiments provide a medical image processing apparatus comprising processing circuitry configured to:
receive CT (Computed Tomography) image data acquired by a first scan setting, output corrected CT image data by inputting the CT image data to a model, wherein the model configured to transform image style from image data acquired by the first scan setting to second scan setting which is different from the first scan setting.

The processing circuitry may be configured to receive three-dimensional scanogram image data as the CT image data, wherein the three-dimensional scanogram image data is used for positioning.

The second scan setting may correspond to that of non-contrast CT scan which is used for subtraction with CT angiography image.

The model may be trained by a first loss based on anatomical structure and a second loss based on image intensity.

The first loss may be based on image data acquired by the first scan setting.

The second loss may be based on image data acquired by the second scan setting.

Certain embodiments provide a method for retargeting medical images comprising: a method to convert a medical image with source scanning and reconstruction parameters (source style) to a medical image with target scanning and reconstruction parameters (target style) for use in an existing target algorithm;
a method to spatially adjust a source medical image to match the expected content of a target algorithm;
a method to update the intensities for a medical image with source scanning and reconstruction parameters to match expected intensities in a medical image with target scanning and reconstruction parameters; and
a method to maintain the structural information in the source medical image.

The medical image with source scanning and reconstruction parameters may be a 3D scanogram volume.

The medical image with target scanning and reconstruction parameters may be a 3D non-contrast-enhanced volume.

The output may be used in place of a non-contrast volume in a subtraction algorithm.

The source medical image may be spatially adjusted using another medical image as reference. The source medical image may be spatially adjusted using landmark detection. The source medical image may be spatially adjusted using a reference atlas.

The intensities of the source medical image may be updated using a neural network trained with a histogram-based loss between network output and target medical imaging data.

The intensities of the source medical image may be updated using histogram matching to a reference histogram based on the target medical imaging data.

The structure of the source medical image may be maintained using a neural network trained with a structural loss between network output and the input source image.

The output of the conversion method may be a direct prediction of the source image with the target style.

The output of the conversion method may be a residual applied to the input source image to create the source image with the target style.

The output of the conversion method may be a transformation function applied to the input source image to create the source image with the target style.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus, comprising:
processing circuitry configured to:
receive computed tomography (CT) image data acquired using a first scan setting, wherein the CT image data comprises 3D scanogram data;
input the CT image data to an adapter to obtain corrected CT image data, wherein the adapter is configured to transform a first image style of the CT image data acquired using the first scan setting to a second, different image style that is characteristic of CT image data acquired using a second scan setting that is different from the first scan setting, wherein the second scan setting corresponds to that of a non-contrast CT scan which is used for subtraction with CT angiography image data; and
output the corrected CT image data,
wherein the processing circuitry is further configured to perform a subtraction of the corrected CT image data and the CT angiography image data.

2. The medical image processing apparatus according to claim 1, wherein the processing circuitry is further configured to receive three-dimensional scanogram image data as the CT image data, wherein the three-dimensional scanogram image data is suitable for use for positioning.

3. The medical image processing apparatus according to claim 1, wherein the first scan setting comprises a lower dose, a lower resolution, and a larger field of view than the second scan setting.

4. The medical image processing apparatus according to claim 1, wherein at least one of:
the first scan setting comprises a first resolution and the second scan setting comprises a second, higher resolution;
the first scan setting comprises a first field of view and the second scan setting comprises a second, smaller field of view;
the first scan setting comprises a filter which is not present in the second scan setting;
the first scan setting comprises a first radiation dose and the second scan setting comprises a second, higher radiation dose;
the first scan setting comprises a first tube current and the second scan setting comprises a second, different tube current;
the first scan setting comprises a first helical pitch and the second scan setting comprises a second, different helical pitch; or
the first scan setting comprises first reconstruction parameters and the second scan setting comprises second, different reconstruction parameters.

5. The medical image processing apparatus according to claim 1, wherein the adapter comprises a model trained by a first loss based on anatomical structure and a second loss based on image intensity.

6. The medical image processing apparatus according to claim 5, wherein the first loss is based on image data acquired by the first scan setting.

7. The medical image processing apparatus according to claim 5, wherein the second loss is based on image data acquired by the second scan setting.

8. The medical image processing apparatus according to claim 5, wherein at least one of:
the model is configured to predict the corrected CT image data directly;
the model is configured to predict a residual to be added to the CT image data to obtain the corrected CT image data; or
the model is configured to predict a transformation function to be applied to the CT image data to obtain the corrected CT image data.

9. The medical image processing apparatus according to claim 1, wherein the adapter is configured to update the intensities of the CT image data to match intensities that would be obtained using the second scan setting.

10. The medical image processing apparatus according to claim 9, wherein the adapter is configured to maintain structural information of the CT image data when updating the intensities.

11. The medical image processing apparatus according to claim 9, wherein the updating of the intensities comprises histogram matching to one or more reference histograms.

12. The medical image processing apparatus according to claim 1, wherein the adapter is configured to spatially adjust the CT image data to match data obtained using the second scan setting.

13. The medical image processing apparatus according to claim 12, wherein the spatial adjusting comprises using at least one of a reference medical image, a reference atlas, or detection of anatomical landmarks.

14. The medical image processing apparatus according to claim 12, wherein the spatial adjusting comprises cropping the CT image data to a target region.

15. The medical image processing apparatus according to claim 12, wherein the spatial adjusting comprises resampling and/or rigid registration.

16. A method, comprising:
receiving computed tomography CT image data acquired using a first scan setting, wherein the CT image data comprises 3D scanogram data;
inputting the CT image data to an adapter to obtain corrected CT image data, wherein the adapter is configured to transform a first image style of the CT image data acquired using the first scan setting to a second, different image style that is characteristic of data acquired using a second scan setting that is different from the first scan setting, wherein the second scan setting corresponds to that of a non-contrast CT scan which is used for subtraction with CT angiography image data; and
outputting the corrected CT image data,
wherein the method further comprises performing a subtraction of the corrected CT image data and the CT angiography image data.

17. A medical image processing apparatus, comprising:
processing circuitry configured to:
receive training data representative of a plurality of subjects, wherein the training data comprises, for each subject, CT image data acquired using a first scan setting, wherein the CT image data comprises 3D scanogram data, and corresponding CT image data acquired using a second, different scan setting, wherein the second scan setting corresponds to that of a non-contrast CT scan which is used for subtraction with CT angiography image data; and
train an adapter to transform a first image style of the CT image data acquired using the first scan setting to a second, different image style that is characteristic of CT image data acquired using the second scan setting,
wherein the training of the adapter comprises using a first loss based on anatomical structure and a second loss based on image intensity.

18. A method, comprising:
receiving training data representative of a plurality of subjects, wherein the training data comprises, for each subject, CT image data acquired using a first scan setting, wherein the CT image data comprises 3D scanogram data, and corresponding CT image data acquired using a second, different scan setting, wherein the second scan setting corresponds to that of a non-contrast CT scan which is used for subtraction with CT angiography image data; and
training an adapter to transform a first image style of the CT image data acquired using the first scan setting to a second, different image style that is characteristic of CT image data acquired using the second scan setting,
wherein the training of the adapter comprises using a first loss based on anatomical structure and a second loss based on image intensity.

* * * * *